(12) United States Patent
Fazeli et al.

(10) Patent No.: US 10,865,848 B2
(45) Date of Patent: Dec. 15, 2020

(54) DUAL-STAGE, SEPARATED GAS/FLUID SHOCK STRUT SERVICING

(71) Applicant: Goodrich Corporation, Charlotte, NC (US)

(72) Inventors: Amir Fazeli, Mississauga (CA); Adnan Cepic, Mississauga (CA); Susanne M. Reber, Strongsville, OH (US)

(73) Assignee: Goodrich Corporation, Charlotte, NC (US)

( * ) Notice: Subject to any disclaimer, the term of this patent is extended or adjusted under 35 U.S.C. 154(b) by 173 days.

(21) Appl. No.: 15/642,081

(22) Filed: Jul. 5, 2017

(65) Prior Publication Data

US 2019/0011009 A1  Jan. 10, 2019

(51) Int. Cl.
| | |
|---|---|
| *F16F 9/06* | (2006.01) |
| *F16F 9/43* | (2006.01) |
| *B64C 25/60* | (2006.01) |
| *B64F 5/40* | (2017.01) |
| *F16F 9/32* | (2006.01) |
| *F16F 15/02* | (2006.01) |
| *F16F 15/023* | (2006.01) |

(52) U.S. Cl.
CPC ............... *F16F 9/43* (2013.01); *B64C 25/60* (2013.01); *B64F 5/40* (2017.01); *F16F 9/062* (2013.01); *F16F 9/065* (2013.01); *F16F 9/3292* (2013.01); *F16F 9/437* (2013.01); *F16F 9/063* (2013.01); *F16F 15/022* (2013.01); *F16F 15/023* (2013.01); *F16F 2222/12* (2013.01); *F16F 2230/46* (2013.01); *F16F 2236/045* (2013.01)

(58) Field of Classification Search
CPC .......... F16F 9/065; F16F 9/43; F16F 2230/46; B64C 25/60
See application file for complete search history.

(56) References Cited

U.S. PATENT DOCUMENTS

| | | |
|---|---|---|
| 2,471,294 A | 5/1949 | Watts |
| 3,889,904 A | 6/1975 | Jones |
| 5,148,896 A | 9/1992 | Ralph |
| 5,548,517 A | 8/1996 | Nance |
| 6,120,009 A | 9/2000 | Gatehouse et al. |
| 6,293,141 B1 | 9/2001 | Nance |

(Continued)

FOREIGN PATENT DOCUMENTS

| | | |
|---|---|---|
| EP | 2937592 | 10/2015 |
| EP | 3118110 | 1/2017 |

(Continued)

OTHER PUBLICATIONS

European Patent Office, European Search Report dated Oct. 29, 2018 in Application No. 18181983.0-1010.

(Continued)

*Primary Examiner* — Paul J Gray
(74) *Attorney, Agent, or Firm* — Snell & Wilmer L.L.P.

(57) ABSTRACT

A method for servicing a dual-stage, separated gas/fluid shock strut may comprise measuring a servicing temperature, charging a secondary gas chamber with compressed gas, wherein a secondary chamber pressure corresponds to the servicing temperature, pumping oil into the shock strut, and charging a primary gas chamber with compressed gas.

20 Claims, 8 Drawing Sheets

(56) References Cited

U.S. PATENT DOCUMENTS

| | | | |
|---|---|---|---|
| 6,676,076 B1* | 1/2004 | Davies | B64C 25/60 |
| | | | 188/314 |
| 7,193,530 B2 | 9/2007 | Nance | |
| 7,552,803 B2 | 6/2009 | Luce | |
| 7,716,964 B2 | 5/2010 | Kurtz et al. | |
| 8,055,396 B2 | 11/2011 | Yates et al. | |
| 8,056,392 B2 | 11/2011 | Ryan et al. | |
| 8,180,504 B1 | 5/2012 | Nance | |
| 8,262,019 B2 | 9/2012 | Schmidt | |
| 8,275,515 B2 | 9/2012 | Wright et al. | |
| 8,565,968 B2 | 10/2013 | Nance | |
| 8,886,402 B1 | 11/2014 | Lou | |
| 8,919,182 B2 | 12/2014 | Luce | |
| 9,045,237 B2 | 6/2015 | Nance | |
| 9,285,007 B2 | 3/2016 | Fazeli et al. | |
| 9,342,481 B2 | 5/2016 | Swearingen et al. | |
| 9,387,924 B2 | 7/2016 | Fazeli et al. | |
| 9,446,859 B2 | 9/2016 | Fazeli et al. | |
| 9,541,151 B2 | 1/2017 | Martin et al. | |
| 2007/0069072 A1 | 3/2007 | Luce | |
| 2008/0033607 A1 | 2/2008 | Zeliff | |
| 2014/0046533 A1 | 2/2014 | Nance | |
| 2015/0266569 A1 | 9/2015 | Fazeli et al. | |
| 2015/0267769 A1 | 9/2015 | Fazeli et al. | |
| 2015/0269794 A1 | 9/2015 | Fazeli et al. | |
| 2016/0027225 A1 | 1/2016 | Fazeli et al. | |
| 2016/0101877 A1* | 4/2016 | Shepherd | G01F 23/296 |
| | | | 29/402.18 |
| 2016/0230831 A1 | 8/2016 | Martin | |
| 2017/0008647 A1 | 1/2017 | Pountney et al. | |
| 2017/0008648 A1 | 1/2017 | Pountney et al. | |
| 2017/0166329 A1 | 6/2017 | Fazeli | |

FOREIGN PATENT DOCUMENTS

| | | |
|---|---|---|
| EP | 3184423 | 6/2017 |
| WO | 2014184521 | 11/2014 |

OTHER PUBLICATIONS

USPTO, First Action Interview Office Action dated Aug. 28, 2018 in U.S. Appl. No. 15/642,098.

European Patent Office, European Search Report dated Aug. 24, 2018 in Application No. 18163431.2-1013.

USPTO, First Action Interview Office Action dated Aug. 28, 2018 in U.S. Appl. No. 15/642,117.

USPTO, First action Interview Office Action dated Aug. 28, 2018 in U.S. Appl. No. 15/642,129.

USPTO, Non-Final Office Action dated Sep. 11, 2018 in U.S. Appl. No. 15/642,058.

Fazeli et al., "Dual-Stage, Pressure-Activated, Mixed Fluid Gas Shock Strut Servicing Monitoring System", U.S. Appl. No. 15/642,058, filed Jul. 5, 2017.

Fazeli et al., "Dual-Stage, Separated Gas/Fluid Shock Strut Servicing Monitoring System Using Two Pressure/Temperature Sensors", U.S. Appl. No. 15/642,098, filed Jul. 5, 2017.

Fazeli et al., "Dual-Stage, Stroke-Activated, Mixed Fluid Gas Shock Strut Servicing Monitoring System", U.S. Appl. No. 15/642,117, filed Jul. 5, 2017.

Fazeli et al., "Dual-Stage, Separated Gas/Fluid Shock Strut Servicing Monitoring System Using One Pressure/Temperature Sensor", U.S. Appl. No. 15/642,129, filed Jul. 5, 2017.

USPTO, Non Final Office Action dated Apr. 16, 2018 in U.S. Appl. No. 15/642,058.

USPTO, Pre-Interview First Office Action dated Jul. 25, 2018 in U.S. Appl. No. 15/642,098.

USPTO, Pre-Interview First Office Action dated Jul. 25, 2018 in U.S. Appl. No. 15/642,117.

USPTO, Pre-Interview First Office Action dated Jul. 25, 2018 in U.S. Appl. No. 15/642,129.

European Patent Office, European Search Report dated Dec. 4, 2018 in Application No. 18181771.9.

European Patent Office, European Search Report dated Dec. 14, 2018 in Application No. 18181990.5.

USPTO, Notice of Allowance Action dated Dec. 17, 2018 in U.S. Appl. No. 15/642,098.

USPTO, Notice of Allowance Action dated Dec. 18, 2018 in U.S. Appl. No. 15/642,058.

USPTO, Notice of Allowance Action dated Dec. 18, 2018 in U.S. Appl. No. 15/642,117.

USPTO, Notice of Allowance dated Dec. 18, 2018 in U.S. Appl. No. 15/642,129.

European Patent Office, European Search Report dated Jan. 2, 2019 in Application No. 18181905.3.

Fazeli et al., "Dual-Stage, Separated Gas/Fluid Shock Strut Servicing Monitoring System Using Two Pressure/Temperature Sensors", U.S. Appl. No. 16/281,715, filed Feb. 21, 2019.

European Patent Office, European Search Report dated Nov. 15, 2019 in Application No. 19190285.7.

European Patent Office, European Search Report dated Nov. 15, 2019 in Application No. 19190312.9.

* cited by examiner

400

| | Temperature (°C) | | |
|---|---|---|---|
| Pressure | -40 | 20 | 50 |
| P2 [psig] | 523 | 550 | 613 |

FIG. 4

DUAL-STAGE, SEPARATED GAS/FLUID SHOCK STRUT SERVICING

FIELD

The present disclosure relates to landing gear, and more particularly, to methods for servicing shock struts.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

Functionality and performance of a landing gear shock strut depends on internal gas and oil levels. Gas pressure and oil volume may be maintained within a design envelope to ensure that the landing gear functionality is within an acceptable range.

SUMMARY

A liquid and gas method for servicing a dual-stage, separated gas/fluid shock strut is disclosed herein, in accordance with various embodiments. The method for servicing a dual-stage, separated gas/fluid shock strut may comprise measuring a servicing temperature, charging a secondary gas chamber with a first quantity of compressed gas, wherein a secondary chamber pressure corresponds to the servicing temperature, pumping an oil into the dual-stage, separated gas/fluid shock strut, and charging a primary gas chamber with a second quantity of compressed gas.

In various embodiments, the secondary gas chamber may be charged with the second quantity of compressed gas until the secondary chamber pressure corresponds to the servicing temperature as indicated by a secondary chamber servicing chart. The method may further comprise extending the dual-stage, separated gas/fluid shock strut in response to the pumping, wherein the dual-stage, separated gas/fluid shock strut extends such that a shock strut extension and the secondary chamber pressure match an oil servicing reference curve. The method may further comprise extending the dual-stage, separated gas/fluid shock strut to a shock strut extension corresponding to the secondary chamber pressure, in accordance with an oil servicing reference curve, wherein the oil is pumped into the dual-stage, separated gas/fluid shock strut to a pre-determined pressure. The oil servicing reference curve may be provided in the form of at least one of a series of curves or a series of tables for various servicing temperatures. The primary gas chamber may be charged with the second quantity of compressed gas until a primary chamber pressure and a shock strut extension correspond to a primary chamber servicing reference curve. The method may further comprise releasing a gas from the primary gas chamber. The method may further comprise releasing a gas from the secondary gas chamber. The pre-determined pressure may be about 75 psi.

A method for servicing a dual-stage, separated gas/fluid shock strut is disclosed herein, in accordance with various embodiments. The method for servicing a dual-stage, separated gas/fluid shock strut may comprise charging a secondary gas chamber with a first quantity of compressed gas, wherein a secondary chamber pressure corresponds to a servicing temperature, pumping an oil into an oil chamber of the dual-stage, separated gas/fluid shock strut, wherein the dual-stage, separated gas/fluid shock strut extends until a first shock strut extension and the secondary chamber pressure match an oil servicing reference curve, and charging a primary gas chamber with a second quantity of compressed gas until a second shock strut extension and a primary chamber pressure match a primary chamber servicing reference curve.

In various embodiments, at least one of the oil servicing reference curve and the primary chamber servicing reference curve correspond to the servicing temperature. The method may further comprise measuring the servicing temperature. The method may further comprise releasing a gas from the primary gas chamber. The method may further comprise releasing a gas from the secondary gas chamber.

A method for servicing a dual-stage, separated gas/fluid shock strut is disclosed herein, in accordance with various embodiments. The method for servicing a dual-stage, separated gas/fluid shock strut may comprise charging a secondary gas chamber with a first quantity of compressed gas, wherein a secondary chamber pressure corresponds to a servicing temperature, circulating an oil through an oil chamber of the dual-stage, separated gas/fluid shock strut via an oil charge port and an oil bleed port, extending the dual-stage, separated gas/fluid shock strut to a shock strut extension corresponding to the secondary chamber pressure according to an oil servicing reference curve, closing the oil bleed port, pumping the oil into the oil chamber until an oil chamber pressure reaches a pre-determined pressure, closing the oil charge port, extending the dual-stage, separated gas/fluid shock strut to a fully extended position, and charging a primary gas chamber with a second quantity of compressed gas until a shock strut extension and a primary chamber pressure match a primary chamber servicing reference curve.

In various embodiments, at least one of the oil servicing reference curve and the primary chamber servicing reference curve correspond to the servicing temperature. The method may further comprise measuring the servicing temperature. The pre-determined pressure may comprise about 75 psi. The method may further comprise releasing a gas from the primary gas chamber. The method may further comprise releasing a gas from the secondary gas chamber.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 4 illustrates an exemplary secondary chamber pressure servicing chart, in accordance with various embodiments;

Figure 1:
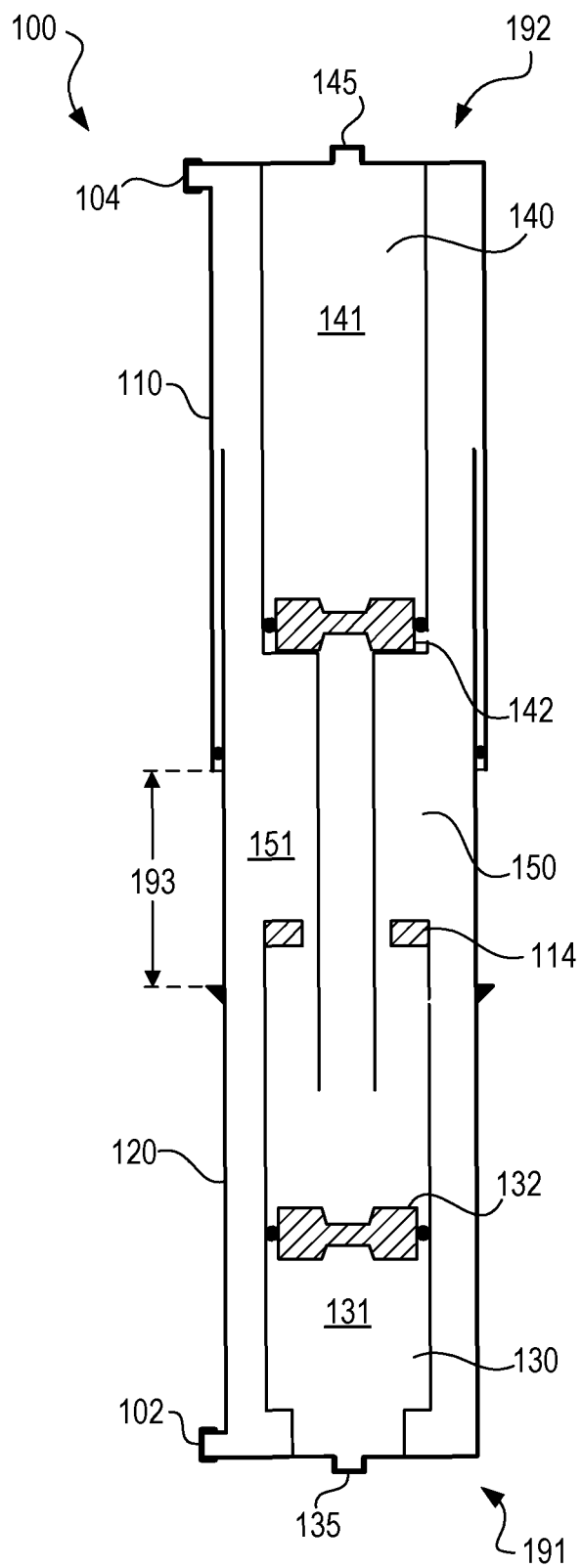
FIG. 1 illustrates a functional schematic view of a dual-stage, separated gas/fluid shock strut at a maximum shock strut extension, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Methods for servicing a dual-stage, separated gas/fluid shock strut are provided herein. The methods, as described herein, may be useful for servicing a shock strut both weight on wheels (WONW), such as when an aircraft is supported by its wheels on the ground, and weight off wheels (WOFFW), such as when an aircraft is suspended in the air (e.g., aircraft on jacks). The methods, as described herein, may be useful for servicing a shock strut in a wide range of ambient temperatures. Since the effects of temperature on the shock strut internal fluid levels have been taken into account in deriving the servicing tables/charts, as described herein, the shock strut may be serviced to the nominal levels of oil and gas, regardless of ambient temperature. The methods, as described herein may provide a more time-efficient servicing, since the oil is serviced at a high pressure which may allow for a less-extensive bleeding procedure and minimal or no shock strut cycling during the oil servicing.

With reference to FIG. 1, a dual-stage, separated gas/fluid shock strut (shock strut) 100 is illustrated, in accordance with various embodiments. Shock strut 100 may comprise a strut cylinder 110 and a strut piston 120. Strut piston 120 may be operatively coupled to strut cylinder 110 as described herein. Strut cylinder 110 may be configured to receive strut piston 120 in a manner that allows the two components to telescope together and absorb and dampen forces transmitted thereto. In various embodiments, a liquid, such as a hydraulic fluid and/or oil may be located within strut cylinder 110. Further, a gas, such as nitrogen or air, may be located within strut cylinder 110. Strut cylinder 110 and strut piston 120 may, for example, be configured to seal such that fluid contained within strut cylinder 110 is prevented from leaking as strut piston 120 translates relative to strut cylinder 110.

Shock strut 100 may consist of a low pressure, primary gas chamber 130 in which gas is contained. In this regard, a volume of gas 131 may be contained within primary gas chamber 130. Shock strut 100 may further consist of a high pressure, secondary gas chamber 140. In this regard, a volume of gas 141 may be contained within secondary gas chamber 140. The volume of gas 131 may be at a lower pressure than the volume of gas 141 when shock strut 100 is in the fully extended position (i.e., at a shock strut stroke of zero), also referred to herein as a full extension 193. Shock strut 100 may further consist of an oil chamber 150. In this regard, a volume of oil 151 may be contained within oil chamber 150. Primary gas chamber 130 may be separated from oil chamber 150 via a separator piston (also referred to herein as a first separator piston) 132. Secondary gas chamber 140 may be separated from oil chamber 150 via a separator piston (also referred to herein as a second separator piston) 142. Primary gas chamber 130 may be located at a first end 191 of shock strut 100. Secondary gas chamber 140 may be located at a second end 192 of shock strut 100.

Shock strut 100 may further consist of an orifice plate 114. Orifice plate 114 may be located in oil chamber 150. Shock strut 100 may comprise an oil charge port 102 in fluid communication with oil chamber 150. Shock strut 100 may comprise an oil bleed port 104 in fluid communication with oil chamber 150. Shock strut 100 may comprise a primary chamber gas charge port 135 in fluid communication with primary gas chamber 130. Shock strut 100 may comprise a secondary chamber gas charge port 145 in fluid communication with secondary gas chamber 140.

In various embodiments, shock strut 100 may be installed onto a landing gear of an aircraft. During a landing event, shock strut 100 may be compressed wherein strut piston 120 translates into strut cylinder 110. During the landing, the shock strut may initially function as a single-stage, separated gas/fluid shock strut by metering oil through orifice plate 114 and compressing the volume of gas 131 in primary gas chamber 130. The compression of primary gas chamber 130 may continue until the pressure (also referred to herein as a primary chamber pressure) in primary gas chamber 130 is greater than the pressure (also referred to herein as a secondary chamber pressure) of the volume of gas 141 within secondary gas chamber 140.

A method of servicing such a shock strut (e.g., shock strut 100), having both oil and gas, is provided herein, in accordance with various embodiments.

Figure 2:
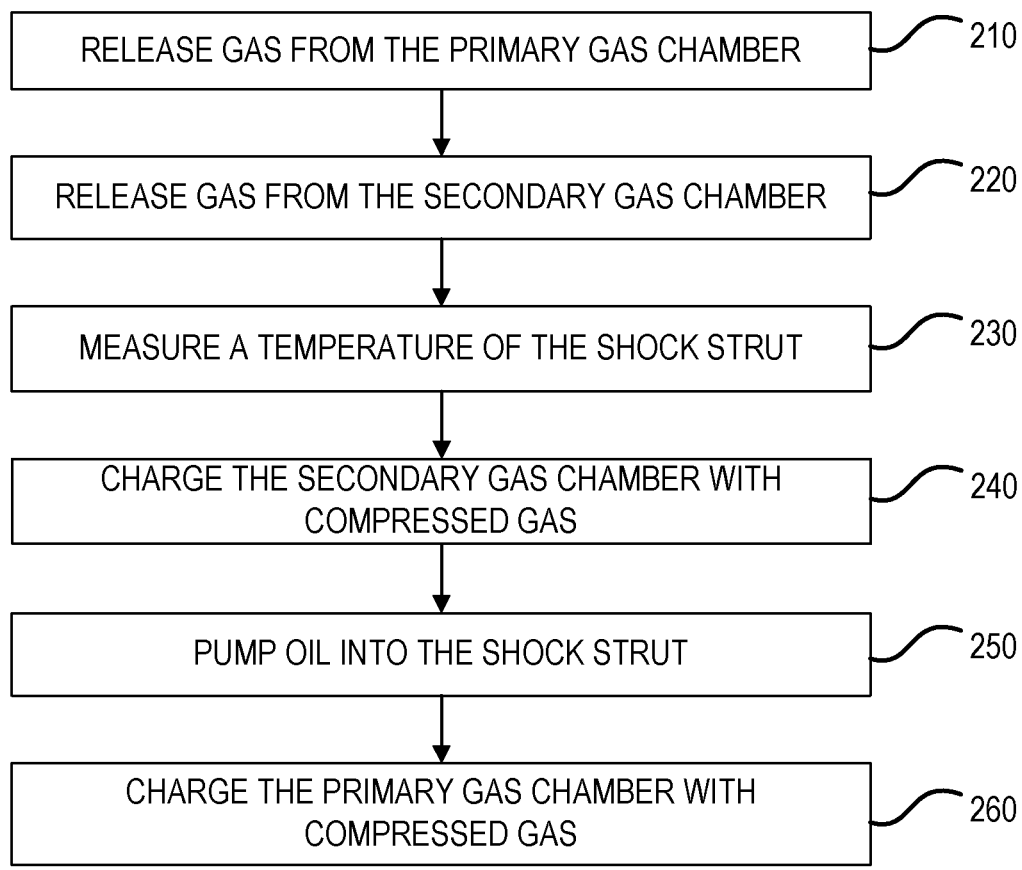
FIG. 2 illustrates a method for servicing a dual-stage, separated gas/fluid shock strut, in accordance with various embodiments.
Figure 3A:
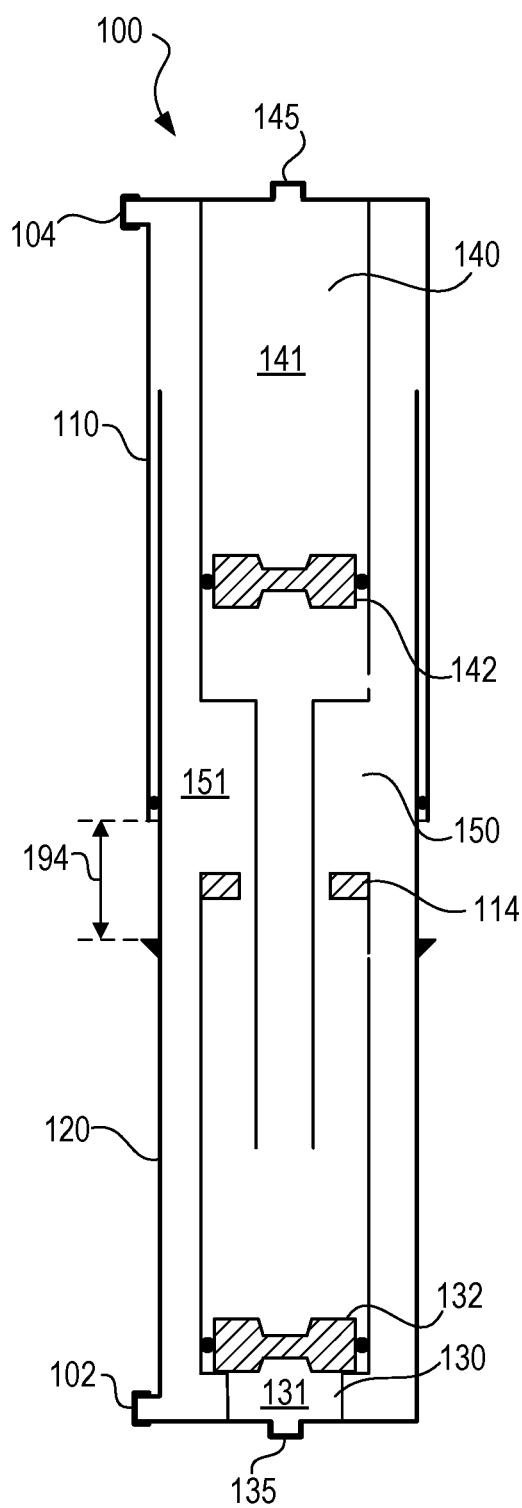
FIG. 3A illustrates a schematic view of the dual-stage, separated gas/fluid shock strut with gas released from a primary chamber, in accordance with various embodiments.
Figure 3B:
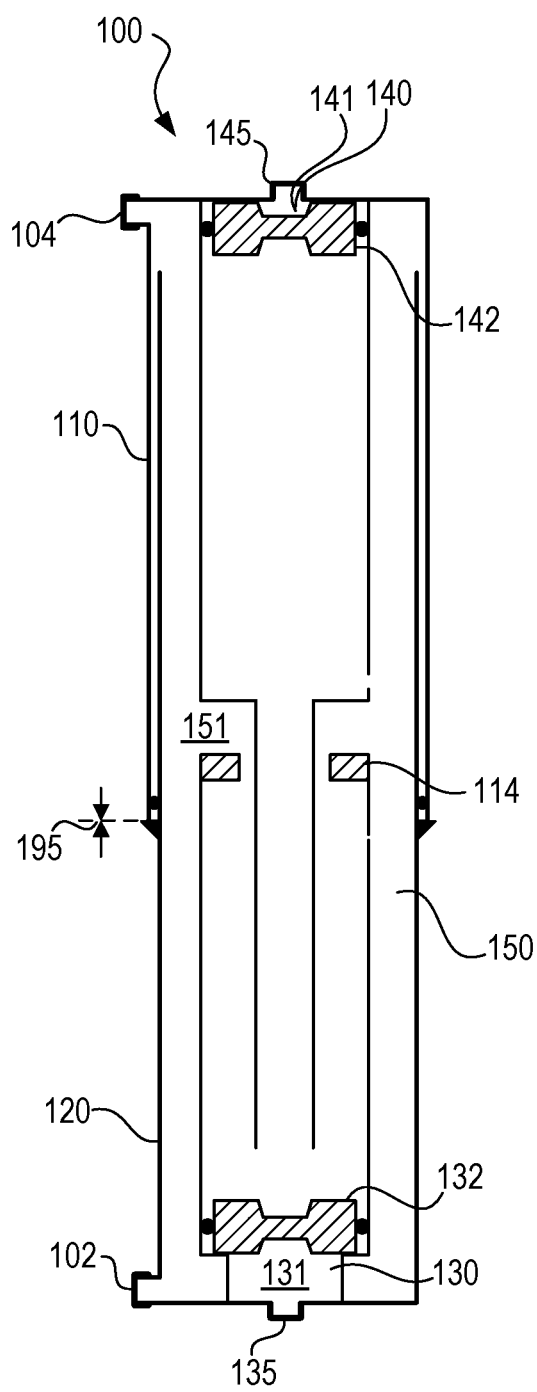
FIG. 3B illustrates a schematic view of the dual-stage, separated gas/fluid shock strut with gas released from the primary chamber and a secondary chamber, in accordance with various embodiments.

With reference to FIG. 2, a method 200 for servicing a shock strut is provided, in accordance with various embodiments. Method 200 may be for servicing a shock strut under WONW conditions. Method 200 may be for servicing a shock strut under WOFFW conditions. With combined reference to FIG. 1 and FIG. 2, method 200 may include releasing gas from the primary gas chamber (step 210). Step 210 may include slowly releasing gas from primary gas chamber 130 via primary chamber gas charge port 135. FIG. 3A illustrates shock strut 100 with gas released from primary gas chamber 130. Shock strut 100 may begin to compress to an extension 194 with gas released from primary gas chamber 130. Method 200 may include releasing gas from the secondary gas chamber (step 220). Step 220 may include releasing gas from secondary gas chamber 140 via secondary chamber gas charge port 145. FIG. 3B illustrates shock strut 100 in a fully compressed position with gas released from secondary gas chamber 140. Shock strut 100 may compress to a minimum extension 195 with gas released from both primary gas chamber 130 and secondary gas chamber 140. Minimum extension 195 may be referred to as a maximum shock strut stroke. If step 210 and step 220 are performed WONW, the shock strut may automatically compress to a fully compressed position due to the weight of the aircraft acting on shock strut 100. If step 210 and step 220 are performed WOFFW, method 200 may further include compressing the shock strut to a fully compressed position using a service tool.

Method 200 may include measuring a servicing temperature of the shock strut (step 230). Step 230 may include measuring a surface temperature of shock strut 100. Step 230 may include measuring an ambient temperature in close proximity to shock strut 100. Step 230 may be performed with a temperature sensor.

Figure 3C:
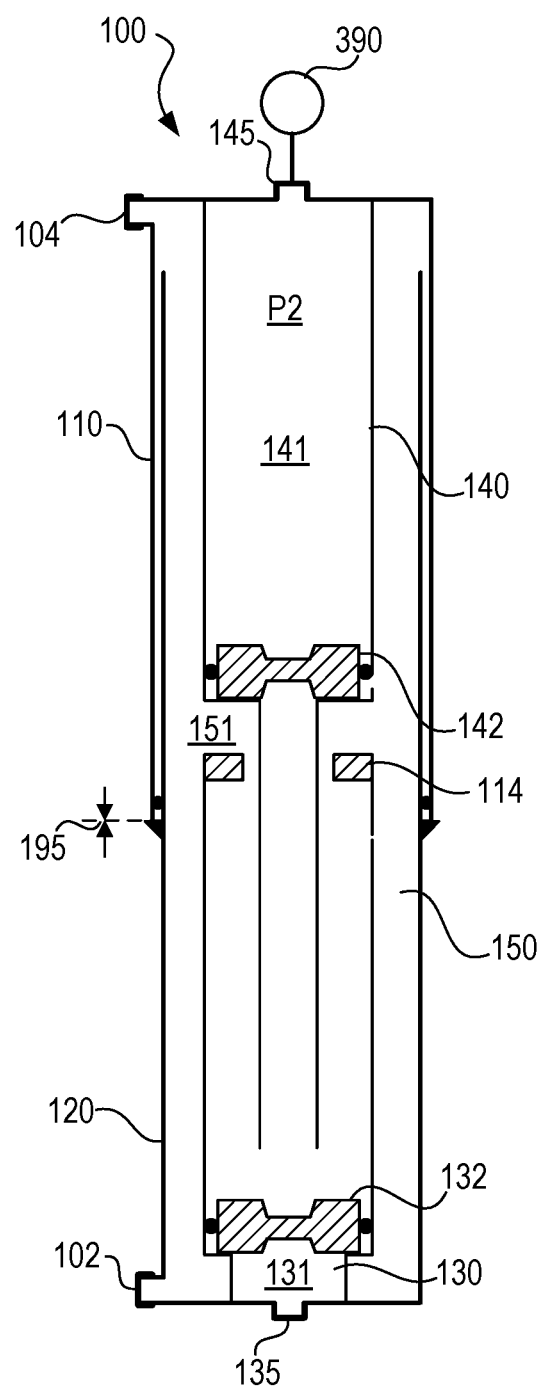
FIG. 3C illustrates a schematic view of the dual-stage, separated gas/fluid shock strut with the secondary chamber charged with compressed gas to a secondary chamber pressure as specified by a secondary chamber pressure servicing chart, in accordance with various embodiments.

Method 200 may include charging the secondary gas chamber 140 with gas (also referred to herein as a first quantity of compressed gas) (step 240). With combined reference to FIG. 2 and FIG. 3C, step 240 may include opening secondary chamber gas charge port 145. Secondary chamber gas charge port 145 may be opened before secondary gas chamber 140 is charged with gas. Step 240 may include connecting a compressed gas bottle 390 to secondary chamber gas charge port 145. Step 240 may include charging the secondary gas chamber 140 with compressed gas until the pressure within secondary gas chamber 140 reaches a pre-determined pressure value P2. Step 240 may include pressurizing the compressed gas to a pre-determined pressure value P2 as specified by a secondary chamber pressure servicing chart which provides secondary gas chamber pressure values P2 for various temperatures, such as servicing chart 400, with momentary reference to FIG. 4.

Secondary gas chamber 140 may be charged to a pressure P2 corresponding to the measured temperature described in step 230. Step 240 may include opening oil bleed port 104 prior to charging secondary gas chamber 140 with gas, in accordance with various embodiments. Opening oil bleed port 104 may allow excessive oil in oil chamber 150 to exit oil chamber 150 as separator piston 142 moves towards first end 191, with momentary reference to FIG. 1.

Figure 3D:
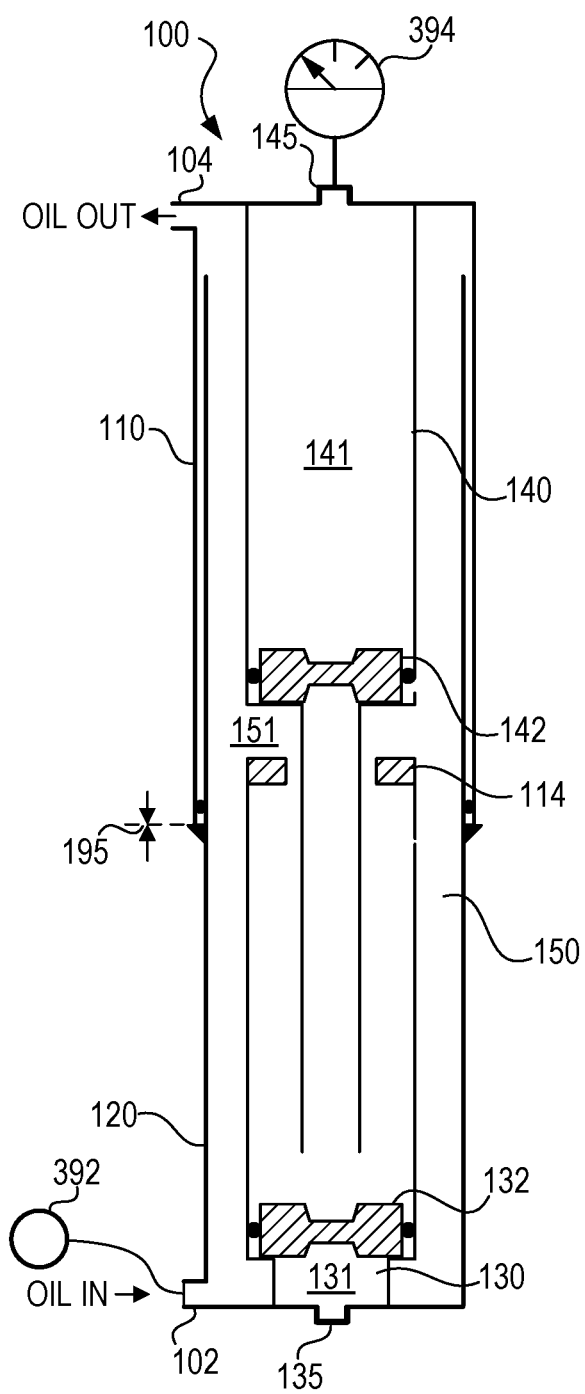
FIG. 3D illustrates a schematic view of the dual-stage, separated gas/fluid shock strut with an oil pump circulating oil through an oil chamber of the shock strut, in accordance with various embodiments.

With reference to FIG. 4, it is noteworthy that servicing chart 400 depicts only three temperatures and that a servicing chart 400 may provide any number of temperatures to provide a finer resolution of temperature versus pressure values. Moreover, the pressure set-points at various servicing temperatures may be determined based on a nominal inflation pressure of the secondary gas chamber 140 at 20° C. (68° F.), by taking real gas properties, of nitrogen for example, into account. Pressure set-points may vary from one shock strut to another based upon shock strut design. With combined reference to FIG. 2 and FIG. 3C, step 240 may include closing secondary chamber gas charge port 145 after the secondary gas chamber 140 has been charged to the pre-determined pressure value P2. Step 240 may include connecting a pressure gauge 394 to secondary chamber gas charge port 145 (see FIG. 3D).

Method 200 may include pumping oil into the shock strut (step 250). Step 250 may include ensuring that the primary chamber gas charge port 135 is open. Opening primary chamber gas charge port 135 may assure that the separator piston 132 is fully translated towards first end 191 (with brief reference to FIG. 1). 130 Step 250 may include opening oil charge port 102. Step 250 may include opening oil bleed port 104. Step 250 may include connecting a high pressure oil servicing pump 392 to oil charge port 102. Step 250 may include pumping oil through oil chamber 150. Step 250 may include circulating oil through oil chamber 150 to remove gas from the oil chamber 150. In this regard, the oil may enter oil charge port 102 and exit oil bleed port 104. Oil may be circulated through oil chamber 150 until no gas bubbles are observed exiting oil bleed port 104.

Figures 3E, 3F:
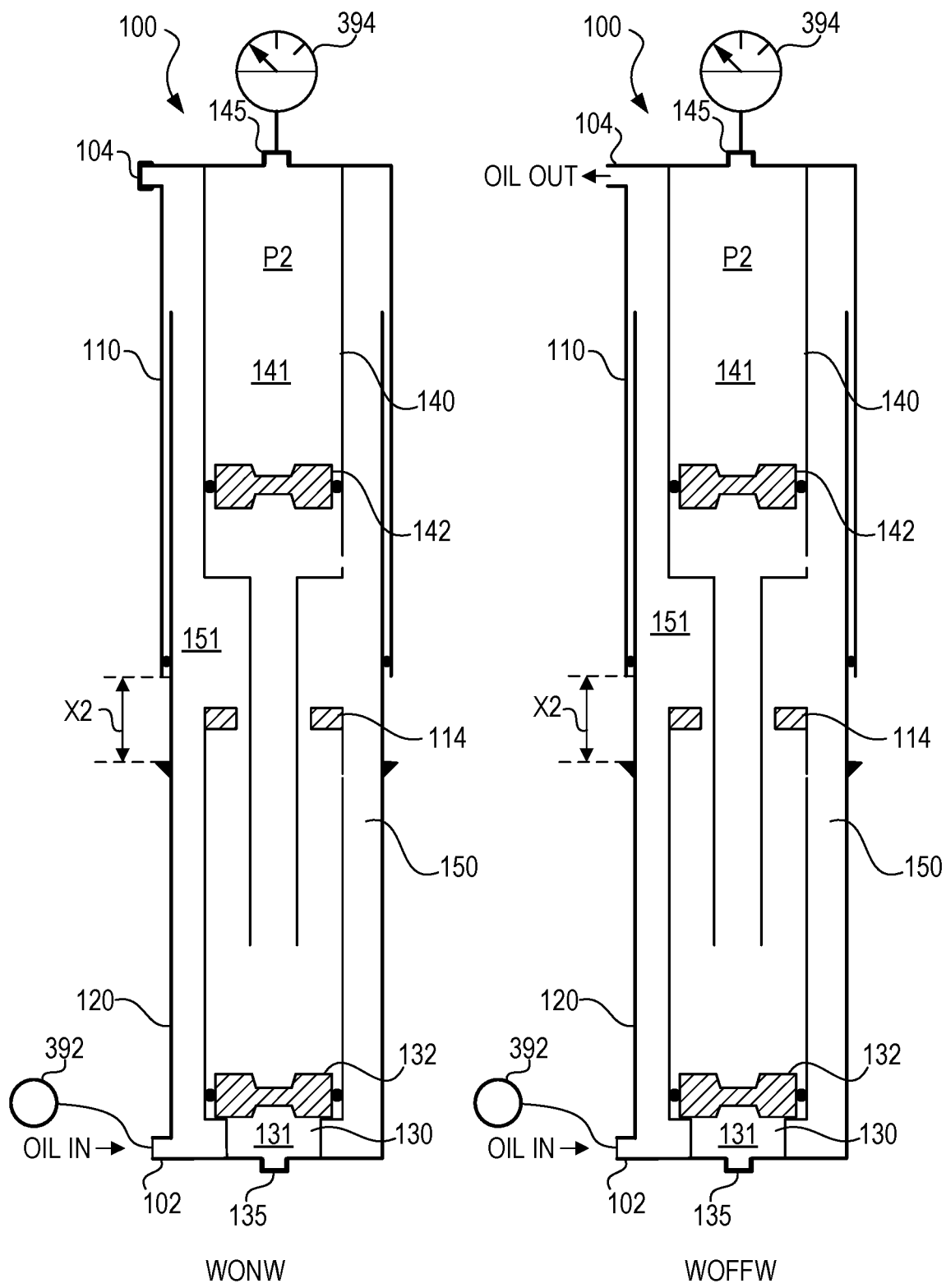
FIG. 3E illustrates a schematic view of the dual-stage, separated gas/fluid shock strut with an oil pump pumping oil into an oil chamber of the shock strut and the shock strut extended to a shock strut extension of X2 in response to the pumping, in accordance with various embodiments.
FIG. 3F illustrates a schematic view of the dual-stage, separated gas/fluid shock strut with an oil pump circulating oil through an oil chamber of the shock strut and the shock strut extended to a shock strut extension of X2 in response to a servicing tool, in accordance with various embodiments.
Figure 5A:
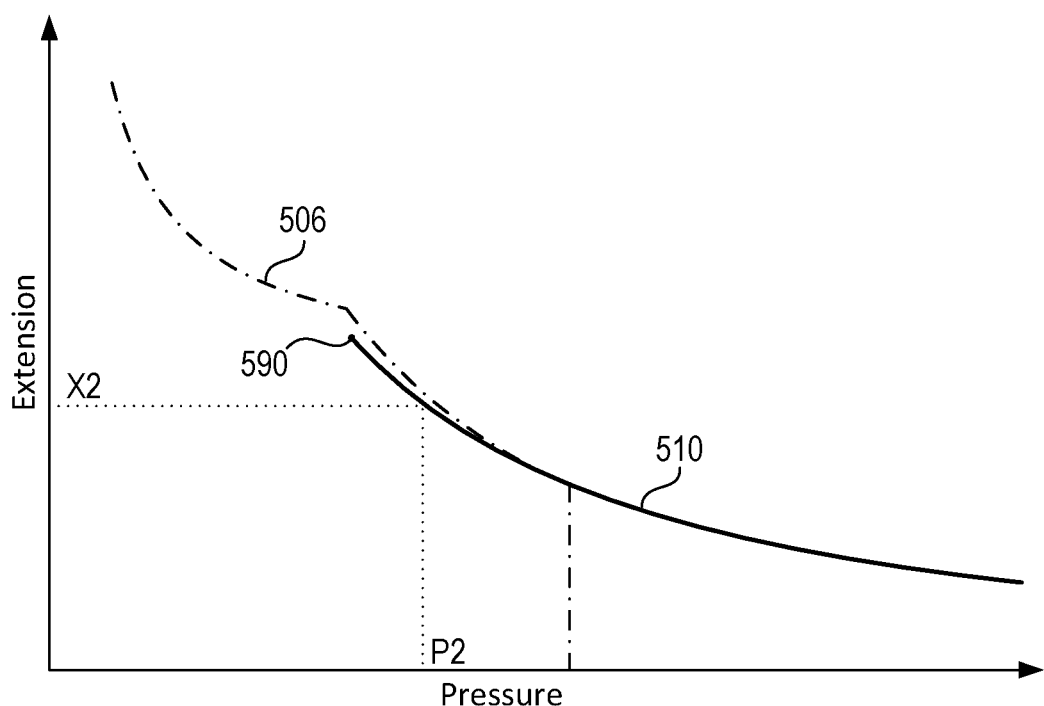
FIG. 5A illustrates an oil servicing reference curve with respect to a secondary chamber pressure curve, in accordance with various embodiments.

With combined reference to FIG. 2, FIG. 3E, and FIG. 5A, if step 250 is performed WONW, step 250 may include closing oil bleed port 104 and pumping oil into oil chamber 150 until the shock strut extends and the pressure (i.e., P2) within secondary gas chamber 140 and the shock strut extension (i.e., X2) values match the oil servicing reference curve 510. Stated differently, step 250 may include pumping oil into oil chamber 150 until the shock strut extends to a shock strut extension (i.e., X2) corresponding to the secondary chamber pressure (i.e., P2), as indicated by oil servicing reference curve 510. In various embodiments, shock strut extension X2 may be referred to herein as a first shock strut extension.

With combined reference to FIG. 2, FIG. 3F, and FIG. 5A, if step 250 is performed WOFFW, step 250 may include leaving oil bleed port 104 open and using a tool (e.g., a shock strut servicing tool) to extend the shock strut 100, whilst circulating oil through oil chamber 150, until the shock strut extends to a shock strut extension (i.e., X2) such that the pressure (i.e., P2) within secondary gas chamber 140 and the shock strut extension (i.e., X2) values match the oil servicing reference curve 510. Since, in this case, the oil bleed port 104 is open, the pressure P2 in secondary gas chamber 140 may remain at the set-point specified in step 240, and thus the shock strut servicing tool is used to extend the shock strut to extension X2. Once extension X2 is achieved, oil bleed port 104 may be closed and oil may be pumped, via high pressure oil servicing pump 392, into oil chamber 150, until the pressure in oil chamber 150 reaches a pre-determined value, such as about 75 psi (517.1 kPa) for example, wherein the term "about" in this regard means, for example, ±10 psi (68.95 kPa) while shock strut extension is maintained with the servicing tool. Charging the oil chamber 150 with pressurized oil may collapse any residual air (or nitrogen) pockets leftover in oil chamber 150. The pressure P2 in secondary gas chamber 140 may remain at the set-point value as specified in step 240. With reference to FIG. 5A, the oil servicing reference curve 510 may be derived as a function of servicing temperature and can be provided to an operator in the form of a series of curves or a series of tables for various servicing temperatures. Oil bulk modulus, oil thermal expansion/contraction, servicing temperature, shock strut design parameters, secondary chamber inflation pressure, and/or real gas properties may be taken into account in deriving oil servicing reference curve 510. Moreover, the Y-axis (i.e., the extension axis) on oil servicing reference curve 510 may be adjusted by the possible difference between the nominal and actual values for shock strut extension in the fully extended position. In various embodiments, the minimum secondary chamber pressure 590 may correspond to the minimum pressure of table 400.

In various embodiments, step 250 may include closing the secondary chamber gas charge port 145 and removing the pressure gauge 394 from the secondary gas chamber 140. Step 250 may include closing the oil charge port 102 and removing the high pressure oil servicing pump 392 from the oil chamber 150.

Figure 3G:
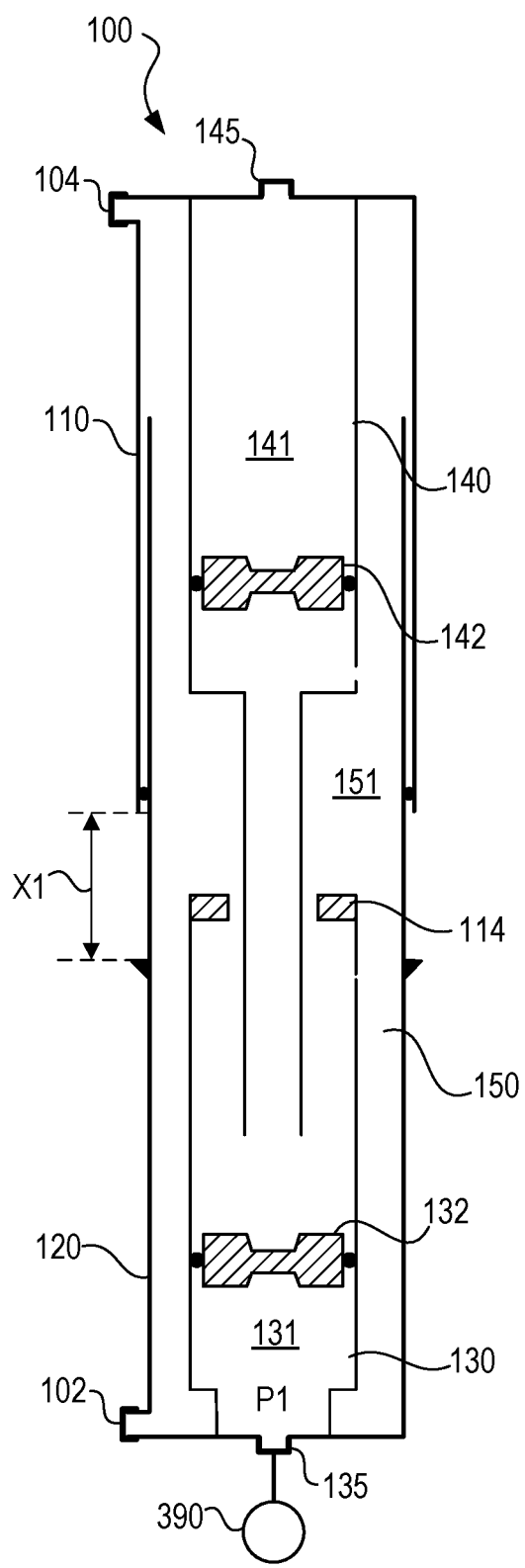
FIG. 3G illustrates a schematic view of the dual-stage, separated gas/fluid shock strut with a gas bottle coupled to the primary gas chamber and having pressurized the primary gas chamber to a primary chamber pressure P1 to match extension X1, in accordance with various embodiments.
Figure 5B:
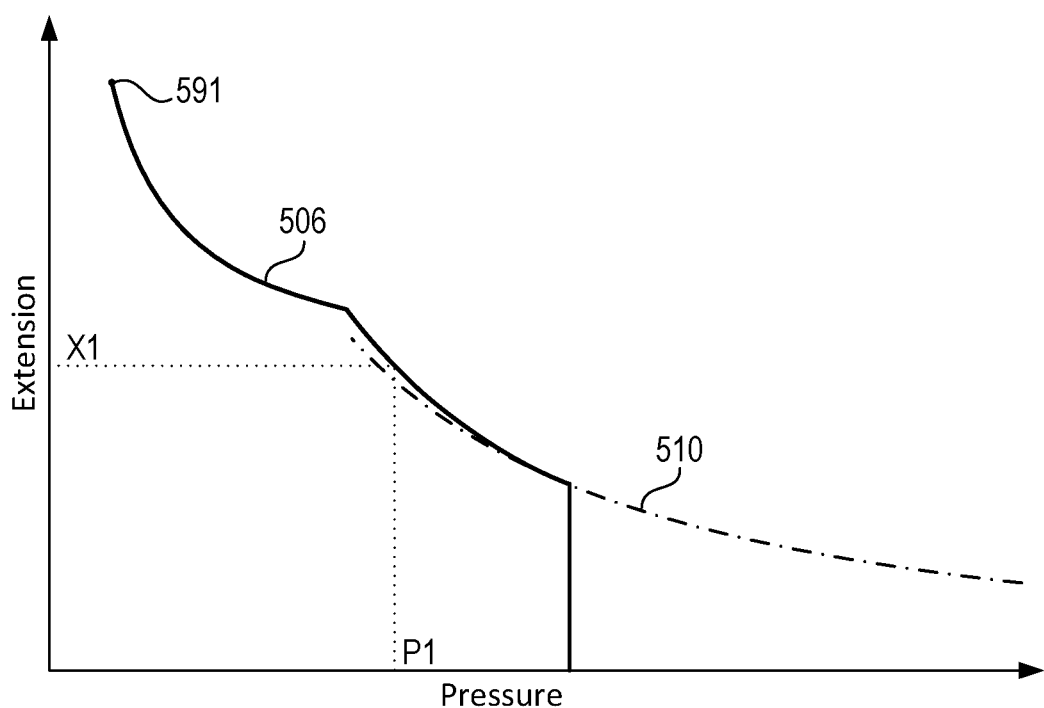
FIG. 5B illustrates a primary chamber servicing reference curve with respect to an oil servicing reference curve, in accordance with various embodiments.

With combined reference to FIG. 2, FIG. 3G, and FIG. 5B, method 200 may include charging the primary chamber with compressed gas (also referred to herein as a second quantity of compressed gas) (step 260). Step 260 may include connecting gas bottle 390 to primary chamber gas charge port 135. Step 260 may include charging primary gas chamber 130 with compressed gas (such as nitrogen for example), via gas bottle 390. Step 260 may include charging primary gas chamber 130 with compressed gas until the primary chamber pressure P1 and the shock strut extension X1 match the primary chamber servicing reference curve 506 (see FIG. 5B). Stated differently, step 260 may include charging primary gas chamber 130 with compressed gas until the primary chamber pressure P1 corresponds to the shock strut extension X1 as indicated by primary chamber servicing reference curve 506 (see FIG. 5B). In various embodiments, shock strut extension X1 may be referred to herein as a second shock strut extension.

If step 260 is performed WOFFW, the service tool may be removed and the primary gas chamber 130 filled with gas until the primary chamber pressure P1 and the shock strut extension, in the fully extended position, match the primary chamber servicing reference curve 506.

With reference to FIG. 5B, primary chamber servicing reference curve 506 may be derived as a function of servicing temperature and can be provided to an operator in the form of a series of curves or a series of tables for various servicing temperatures. Oil bulk modulus, oil thermal expansion/contraction, servicing temperature, shock strut design parameters, secondary chamber inflation pressure, and/or real gas properties may be taken into account in deriving primary chamber servicing reference curve 506. Moreover, the Y-axis on primary chamber servicing reference curve 506 may be adjusted by the possible difference between the nominal and actual values for shock strut extension in the fully extended position. In various embodiments, the minimum primary chamber pressure 491 may occur at a maximum extension.

Step 260 may include closing the primary chamber gas charge port 135 and removing the gas bottle 390 from the primary gas chamber 130.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for servicing a dual-stage, separated gas/fluid shock strut, comprising:
    measuring a servicing temperature;
    charging a secondary gas chamber with a first quantity of compressed gas, wherein a secondary chamber pressure corresponds to the servicing temperature;
    pumping an oil into an oil chamber of the dual-stage, separated gas/fluid shock strut subsequent to the secondary gas chamber being charged with the first quantity of compressed gas; and
    charging a primary gas chamber with a second quantity of compressed gas,
    wherein the primary gas chamber is fluidly separated from the oil chamber via a first separator piston and the secondary gas chamber is fluidly separated from the oil chamber via a second separator piston.

2. The method of claim 1, wherein the secondary gas chamber is charged with the second quantity of compressed gas until the secondary chamber pressure corresponds to the servicing temperature as indicated by a secondary chamber servicing chart.

3. The method of claim 1, further comprising extending the dual-stage, separated gas/fluid shock strut in response to the pumping, wherein the dual-stage, separated gas/fluid shock strut extends such that a shock strut extension and the secondary chamber pressure match an oil servicing reference curve.

4. The method of claim 1, further comprising:
    extending the dual-stage, separated gas/fluid shock strut to a shock strut extension corresponding to the secondary chamber pressure, in accordance with an oil servicing reference curve, wherein the oil is pumped into the dual-stage, separated gas/fluid shock strut to a pre-determined pressure.

5. The method of claim 3, wherein the oil servicing reference curve is provided in the form of at least one of a series of curves or a series of tables for various servicing temperatures.

6. The method of claim 1, wherein the primary gas chamber is charged with the second quantity of compressed gas until a primary chamber pressure and a shock strut extension correspond to a primary chamber servicing reference curve.

7. The method of claim 1, further comprising releasing a gas from the primary gas chamber.

8. The method of claim 1, further comprising releasing a gas from the secondary gas chamber.

9. The method of claim 4, wherein the pre-determined pressure is about 75 psi (517.1 kPa).

10. A method for servicing a dual-stage, separated gas/fluid shock strut, comprising:
    charging a secondary gas chamber with a first quantity of compressed gas, wherein a secondary chamber pressure corresponds to a servicing temperature;
    pumping an oil into an oil chamber of the dual-stage, separated gas/fluid shock strut, wherein the dual-stage, separated gas/fluid shock strut extends until a first shock strut extension and the secondary chamber pressure match an oil servicing reference curve; and
    charging a primary gas chamber with a second quantity of compressed gas until a second shock strut extension and a primary chamber pressure match a primary chamber servicing reference curve,
    wherein the primary gas chamber is fluidly separated from the oil chamber via a first separator piston and the secondary gas chamber is fluidly separated from the oil chamber via a second separator piston.

11. The method of claim 10, wherein at least one of the oil servicing reference curve and the primary chamber servicing reference curve correspond to the servicing temperature.

12. The method of claim 10, further comprising measuring the servicing temperature.

13. The method of claim 10, further comprising releasing a gas from the primary gas chamber.

14. The method of claim 10, further comprising releasing a gas from the secondary gas chamber.

15. A method for servicing a dual-stage, separated gas/fluid shock strut, comprising:
    charging a secondary gas chamber with a first quantity of compressed gas, wherein a secondary chamber pressure corresponds to a servicing temperature;
    circulating an oil through an oil chamber of the dual-stage, separated gas/fluid shock strut via an oil charge port and an oil bleed port;
    extending the dual-stage, separated gas/fluid shock strut to a shock strut extension corresponding to the secondary chamber pressure according to an oil servicing reference curve;
    closing the oil bleed port;
    pumping the oil into the oil chamber until an oil chamber pressure reaches a pre-determined pressure while maintaining the shock strut extension;
    closing the oil charge port;
    extending the dual-stage, separated gas/fluid shock strut to a fully extended position; and
    charging a primary gas chamber with a second quantity of compressed gas until a shock strut extension and a primary chamber pressure match a primary chamber servicing reference curve.

16. The method of claim 15, wherein at least one of the oil servicing reference curve and the primary chamber servicing reference curve correspond to the servicing temperature.

17. The method of claim 15, further comprising measuring the servicing temperature.

18. The method of claim 15, wherein the pre-determined pressure comprises about 75 psi (517.1 kPa).

19. The method of claim 15, further comprising releasing a gas from the primary gas chamber.

20. The method of claim 15, further comprising releasing a gas from the secondary gas chamber.

* * * * *